May 18, 1954 R. BATAILLE ET AL 2,679,005
OSCILLATION GENERATION SYSTEM
Filed July 8, 1948 7 Sheets-Sheet 1
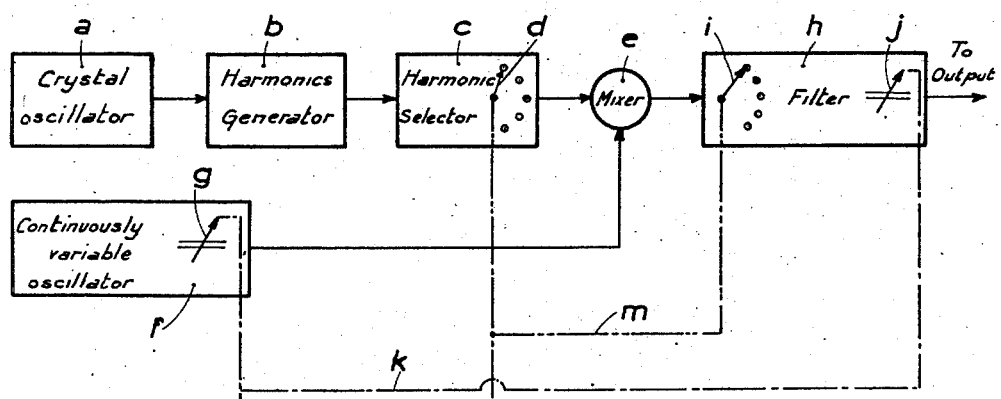
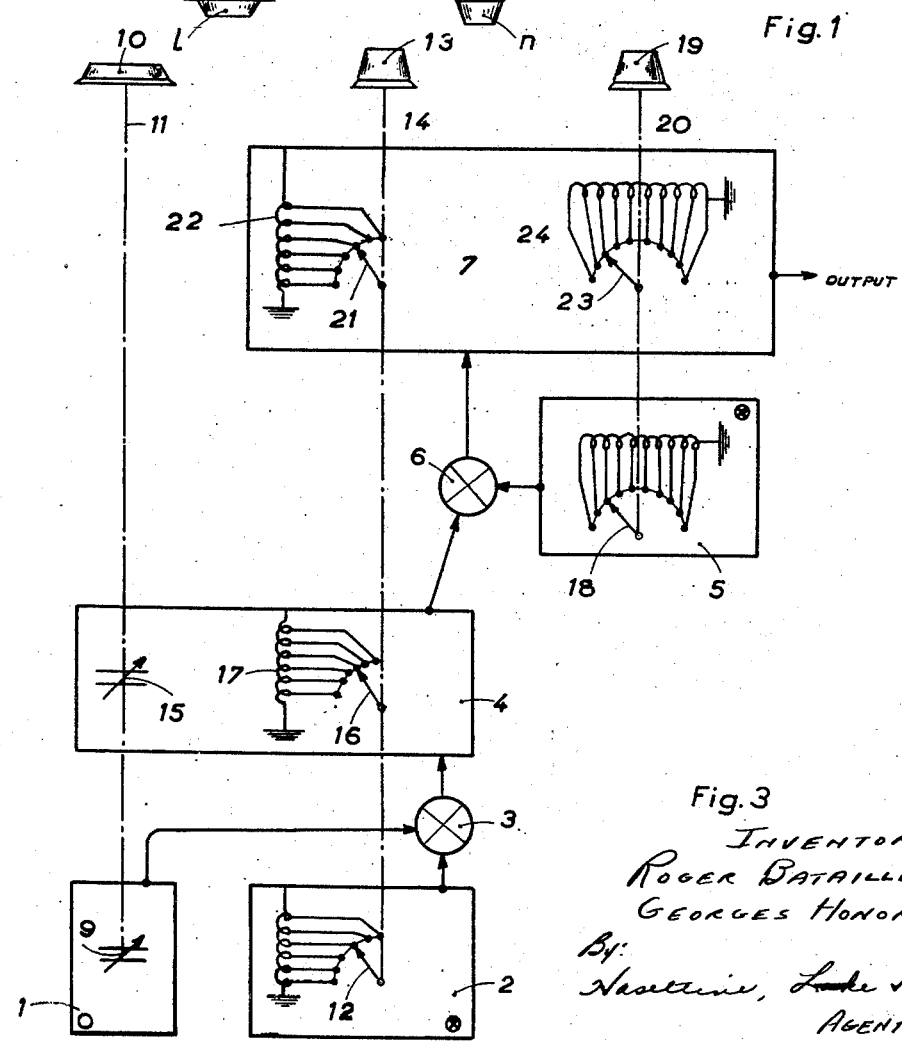
Fig.1
Fig.3
INVENTORS
ROGER BATAILLE
GEORGES HONORAT
By:
Nasseline, Lake v.C.
AGENTS

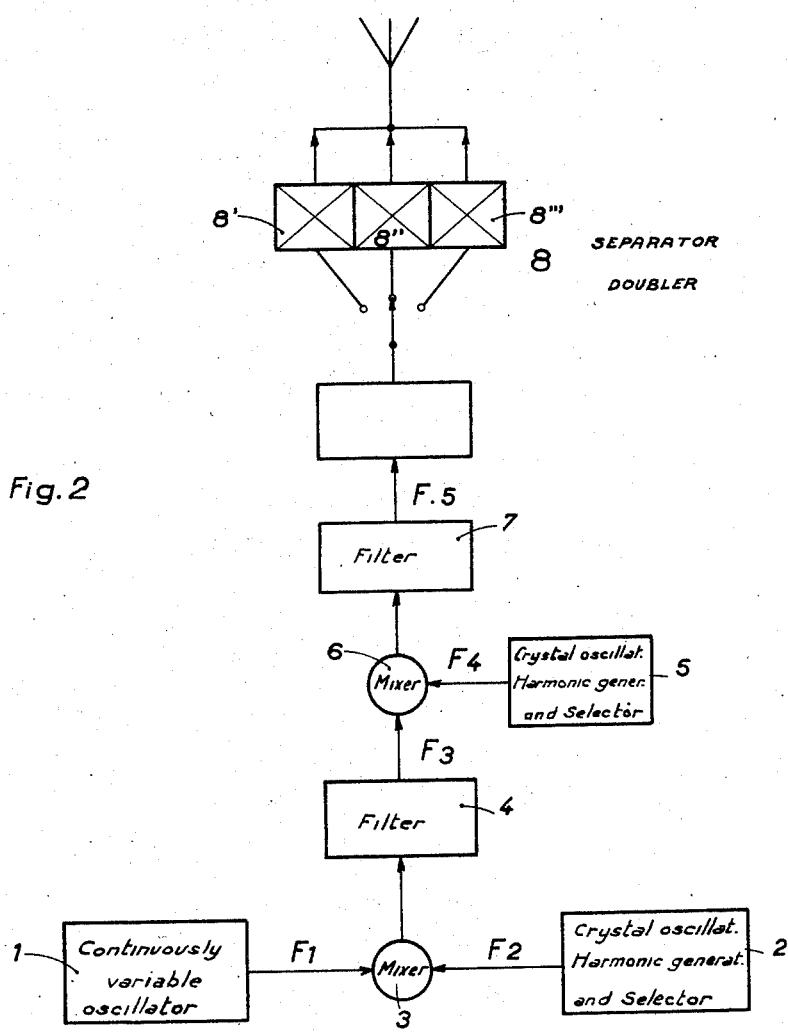

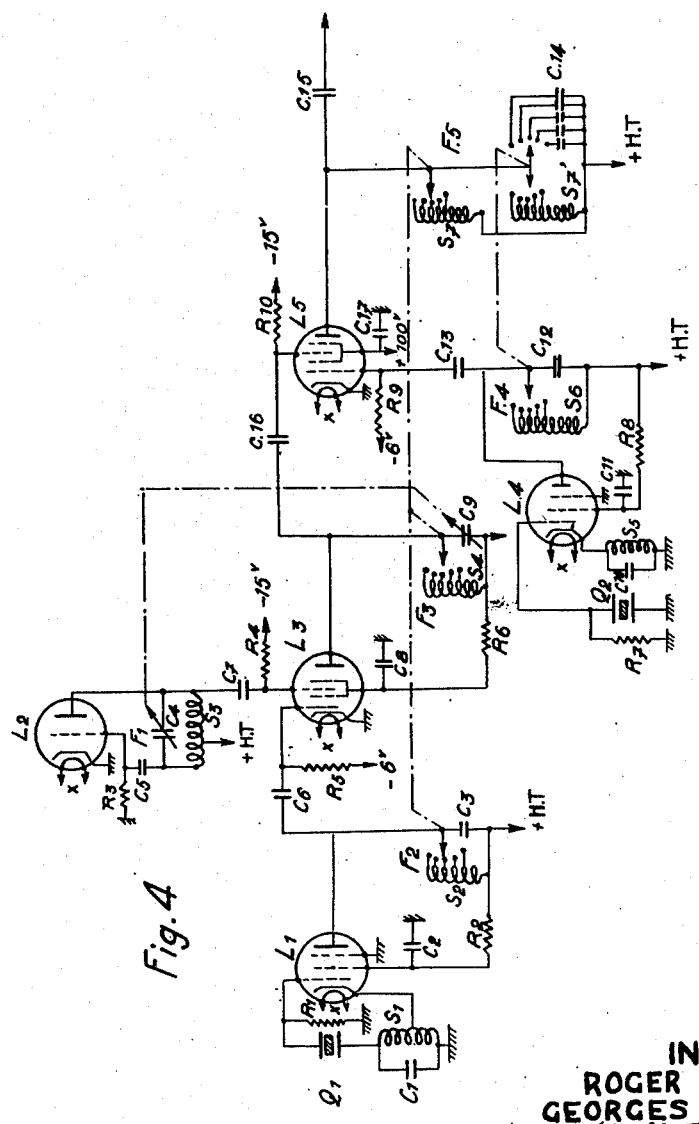

May 18, 1954  R. BATAILLE ET AL  2,679,005
OSCILLATION GENERATION SYSTEM
Filed July 8, 1948  7 Sheets-Sheet 5

INVENTORS
ROGER BATAILLE
GEORGES HONORAT
By:
Hamilton, Lake & Co.
AGENTS

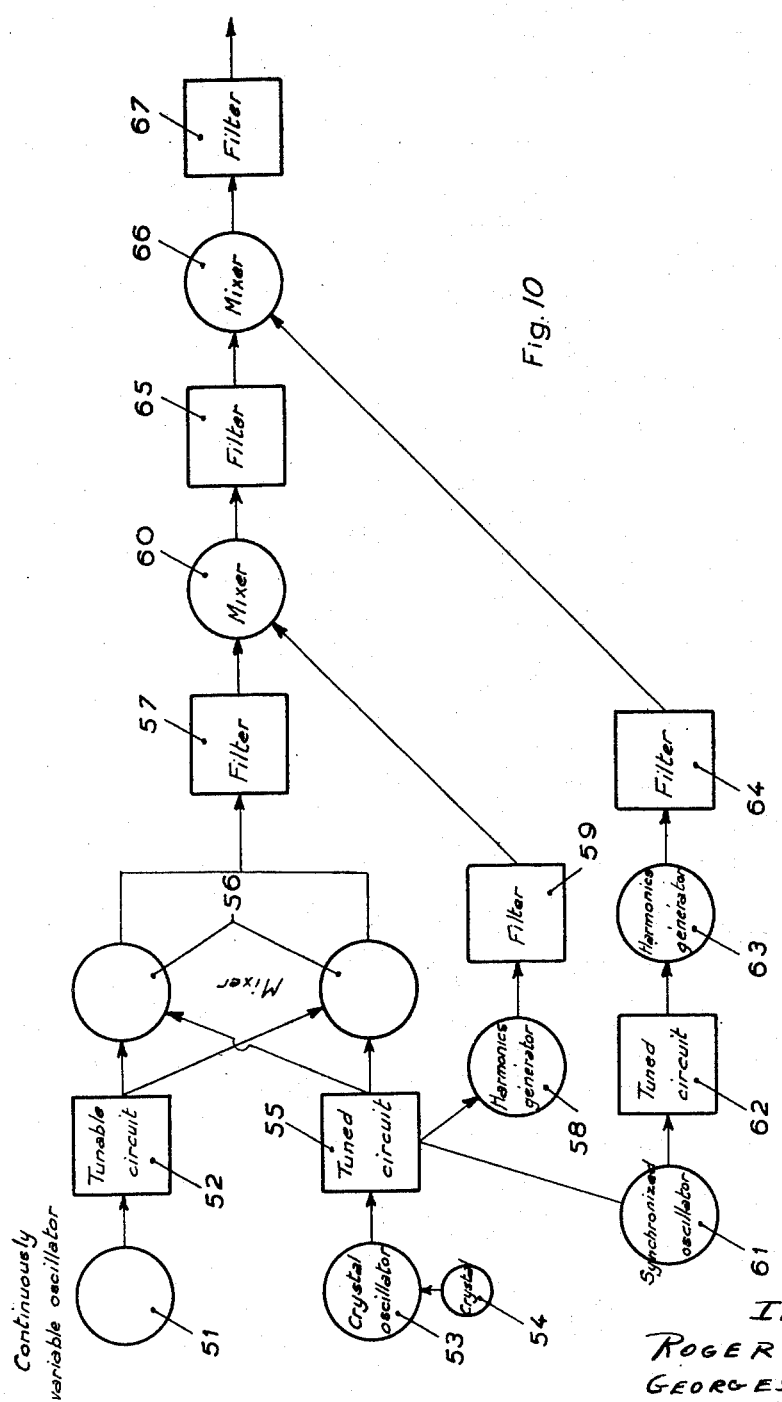

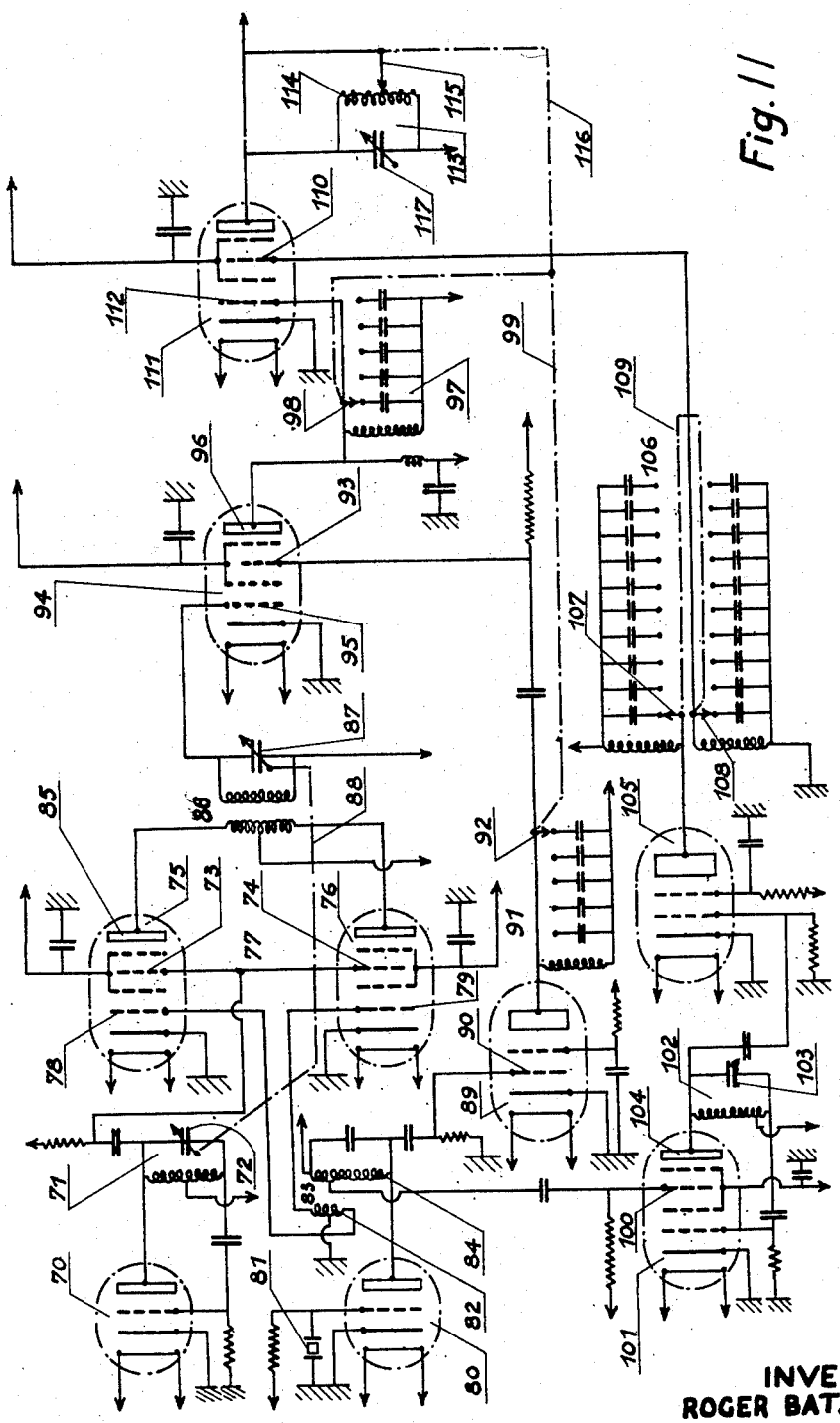

Patented May 18, 1954

2,679,005

UNITED STATES PATENT OFFICE 2,679,005

OSCILLATION GENERATION SYSTEM

Roger Bataille, Montmorency, and Georges Honorat, Neuilly-sur-Seine, Seine, France, assignors to Societe Française des Telecommunications, Neuilly-sur-Seine, Seine, France, a corporation of France Original application October 18, 1946, Serial No. 704,074, now Patent No. 2,606,285, dated August 5, 1952. Divided and this application July 8, 1948, Serial No. 37,696. In France November 23, 1942

Section 1, Public Law 690, August 8, 1946
Patent expires November 23, 1962

14 Claims. (Cl. 250—36)

Many attempts have been made by those skilled in the art to stabilize radio-electric transmitters and receivers in order that for any well determined position of their controls, they will be tuned on a well determined constant wave length. In the devices of the conventional type, the desired frequency variations in transmission as well as in reception are obtained by means of at least one variable capacitor. Under the effect of a number of factors, such as variations in temperature, pressure, etc. the resonance frequency may vary in the conventional devices, for the same position of the controlling member, by about $1/1000$; therefore, frequencies higher than 50 kc., this variation may escape the tuned band of a receiver initially suitably adjusted. This is the reason why it has been necessary until now to "tune up" the receiver, i. e. to use a trial and error method acoustically appreciating the changes in intensity of the reception, and even, in certain cases, to alter the adjustment of the receiver during the reception.

Attempts have already been made to eliminate this defect by using crystal devices to determine the resonance frequency of a transmitter or of a receiver. Quartz or piezo-electric crystals do indeed enable the determination of the frequency with a much higher precision of the order of $1/100,000$. However, these devices have not so far allowed a continuous variation. A quartz device gives only, for example, the basic frequency and its various harmonics, i. e. in any case a strictly limited number of frequencies. Practically, this results in a number of defects, particularly in the military field, where the resultant necessity of transmitting over one or more determined frequencies of limited number allows easy identification of the transmitter using said frequencies.

The present invention has for its object to benefit simultaneously from the advantages inherent to oscillating devices of the quartz type and to oscillators of the continuous type, eliminating simultaneously the defects of each of these devices. According to the invention, the frequency band on which it is desired to operate continuously, and which may be a very large one, as a matter of fact a band covering all frequencies used in radio-electric transmissions, is covered by one or more quartz devices, preferably not more than one or two, which, taking into account the crystal or crystals harmonics, divides the said band into elementary bands, which bands may be covered continuously by means of an oscillator of a known continuously variable type. In other words, if it is desired to tune a transmitter according to the invention on any wave length which the set uses, the set is tuned by means of a quartz device on an approximate frequency supplied by the piezo-electric oscillations, the negative or positive complement to obtain the desired wave length being supplied by the continuously variable oscillator.

This application is a division of application Serial No. 704,074 filed October 18, 1946, now Patent No. 2,606,285, for Double Heterodyne Radio Receiver.

In a transmitter according to the invention, oscillations supplied by a continuously variable frequency oscillator of low frequency, having accordingly only a small drift, are mixed with oscillations supplied by one or more oscillating devices, the frequency of which is stabilized by a piezo-electric crystal either on the value of the resonance frequency of the crystal, or on one of its harmonics, the frequency value of the continuously variable oscillator, the value of the resonance frequency of the crystal or crystals and their harmonics and the mixture of said component oscillations being such that the frequency of the resulting oscillations may have any desired value over a continuous band of frequencies, the width thereof being practically as large as desired.

It will be seen, on the one hand, that the whole of the band may be covered in a continuous manner as in the case of an oscillator of the conventional type and, on the other hand, that the maximum error introduced, which is obviously the sum of the errors introduced by the quartz device and by the continuous variation oscillator, is always very small. The error resulting from the quartz device, amounting to only $1/100,000$ of its frequency, always remains very small even if said frequency is high; the error introduced by the continuous variation oscillator, though amounting to $1/1000$ of its frequency, is small, as this frequency has a small absolute value, amounting only to the complement to be added to the frequency supplied by the quartz device.

If it is desired, for example, to accurately and continuously cover a band from 0 (theoretical) to 30,000 kc. or more, in practice from 100 kc. to 30,000 kc., the following method may be used: a first quartz stabilized oscillator provides with a single crystal frequencies of 1000, 2000 etc. up to 30,000 kc. which differ one from the other by 1000 kc. A second oscillator, again quartz stabilized, provides with a single crystal, in each of the 1000 kc. sections thus defined, intermediate divisions having 100, 200, 300 etc. up to 1000 kc. difference. A third oscillator continuously variable from 100 to 200 kc., consisting of an oscillator of the conventional type, provides a continuous variation in each of the 100 kc. bands thus limited.

The maximum errors thus introduced are as follows: in the first quartz circuit: 0.30 kc.; in the second quartz circuit: 0.01 kc.; in the continuous variation circuit: 0.2 kc.; i. e. a total of 0.51 kc. Said maximum variation will not tune out of the passing band of a receiver so that this latter keeps tuned in spite of all disturbing factors which may occur. Accordingly, to obtain a sure transmission on any wave length, it will be sufficient to adjust the controls of the receiver in the position corresponding to said wave length, without hunting or acoustic appreciation.

On the other hand, the resulting frequency has no troublesome parasitic frequencies, the nearest one being —30 decibels, far from the useful final tone in even the most unfavorable case.

In the above example, the control operations for reception are limited to three:

(1) Selection of the thousands of kc. by means of a 30 step switch;

(2) Selection of the hundreds of kc. by means of a 10 step switch;

(3) Selection of the units from 0 to 100 kc. by means of a graduated dial.

In the form of execution of a transmitter according to the present invention, to the oscillations generated by the low frequencies oscillator able to vary in a continuous manner, there will be added fixed frequency oscillations, generated for example by one of the piezo-electric stabilized oscillators, before mixing them with the component oscillations generated by the other crystal oscillator or oscillators.

This previous addition, raising the value of the frequency of the oscillations varying in a continuous manner in frequency, makes easier the selection of the resulting oscillations.

The fixed frequency oscillations may be added to the oscillations from the continuously variable oscillator by using a symmetrical system. This will allow the elimination of the harmonics of the continuously variable oscillations which, otherwise, might lead to interferences for certain frequency values.

In the above numerical example, the elementary interval of the first harmonic scale is 100 kc. and the elementary interval of the other harmonic scale is 1000 kc. Two piezo-electric crystals are used for these harmonic scales.

In an alternative embodiment, only one piezoelectric crystal is used for both scales, the one being obtained in the manner above described, i. e. from a stabilized oscillator with a piezoelectric crystal, and the other one by means of an oscillator the frequency stability of which will be obtained through synchronization from the first oscillator. Thus one crystal only is necessary.

In one form of execution of the invention, the continuously variable oscillations are mixed in the first instance with the harmonics of the lowest scale.

On the contrary, in an alternative embodiment the oscillations from the low frequency oscillator, the frequency of which may vary in a continuous manner, are previously mixed with the oscillations of the highest scale of harmonics. The resulting oscillations are thus disposed in distant enough sections of the frequency spectrum and it is thus unnecessary for their selection to use devices comprising variable condensers, eliminating thus the problem of ganging them.

In the following description, reference is made to the annexed drawings, in which:

Figure 1 is a block diagram of a transmitter according to the invention;

Figure 2 is a block diagram of a transmitter according to the invention, for another embodiment;

Figure 3 shows diagrammatically an embodiment of the control means for the embodiment of Figure 2;

Figure 4 is a wiring diagram for the embodiment of Figure 2;

Figure 10 is a block diagram of another embodiment;

Figure 11 is a wiring diagram of the embodiment shown on Figure 10.

Figure 5:
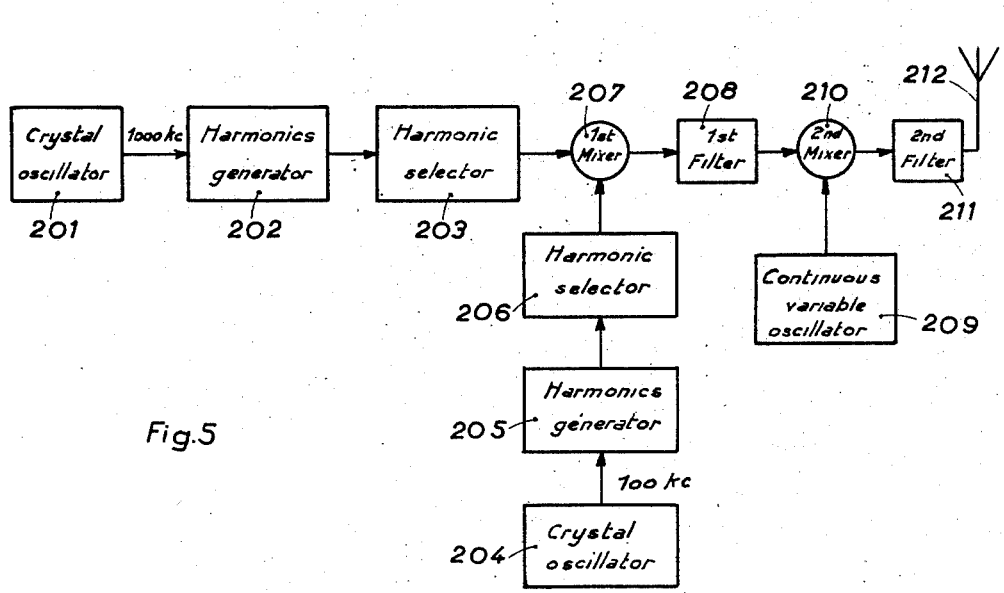
Figure 5 is a block diagram of another embodiment.

It is pointed out that in the following description, the numerical examples given for the frequency values are intended only for a proper understanding of the description.

Reference will first be made to Fig. 1. In the exemplary embodiment shown, a transmitter according to our invention comprises a piezo-electric crystal oscillator $a$ supplying frequency-stable oscillations at a frequency equal to the fundamental frequency of the crystal. This oscillator is followed by a harmonics generator $b$ which supplies output oscillations at a plurality or succession of frequencies or harmonics of the said fundamental frequency. The harmonics generator $b$ is followed by a harmonic selector $c$ which supplies an output which comprises only a single one of the harmonics of the said multiplicity of harmonics fed to it, the order of this harmonic being defined by the setting of a selector member $d$ adapted to connect into the circuit a desired one of a plurality of oscillating circuits. The harmonic selected by the selector $c$ is mixed, in a mixer $e$, with oscillations having a low natural frequency supplied by an oscillator $f$, the frequency of which being continuously variable within an interval substantially equal to that between two successive ones of said harmonics. The frequency of the oscillations supplied by the oscillator $f$ is dependent on the setting of a variable condenser $g$. The resultant oscillations from the mixing step at the output from mixer $e$ are fed to a filter $h$ the passing frequency of which is controlled by means of a step-by-step operable selector member $i$ and a variable condenser $j$. A mechanical connection $k$ is provided between the movable parts of both condensers $g$ and $j$ which are thus operable from a common control member $l$. A further mechanical connection $m$ is provided between the selector members $d$ and $i$ which are thus operable from a common control button $n$.

Assuming it is desired to tune the transmitter thus described to any desired wavelength of a continuous frequency band, the harmonic selector $d$ is, through actuation of the button $n$, so adjusted as to provide at its output a harmonic approximating in frequency the desired frequency, and the continuously-adjustable oscillator $f$ is, by means of the member $l$, adjusted to the frequency value which is the positive or negative complement of the said harmonic in order to obtain the desired frequency.

Rather than a single piezo-electric crystal-controlled oscillator, two crystal oscillators may be used. In such an embodiment of the invention, there may be combined, with a conventional continuously-variable oscillator of any suitable type, a first crystal oscillator adapted to be adjusted to any one of a number of predetermined frequencies, i. e. the fundamental crystal frequency and a number of the harmonics thereof, and a second crystal oscillator adapted to be adjusted to any one of a number of predetermined frequencies i. e. the fundamental frequency of the second crystal and a number of its harmonics.

If, for example, it is desired to cover with the device according to the invention, in a continuous manner, the frequency band between 100 kc. and 30,000 kc., the oscillators may be selected with characteristics such that the oscillator A will generate oscillations capable of continuously varying from 100 kc. to 200 kc, the oscillator B generating frequencies of 100, 200, 300, etc. up to 1000 kc., the oscillator C generating oscillations of a frequency of 1000, 2000, 3000 etc. up to 30,000 kc. If, for example, it is desired to tune the set on the 24,495 kc. frequency, the oscillator C will be adjusted on 24,000 kc., the oscillator B on 400 kc. and the oscillator A on 95 kc.; these frequencies are added and the final frequency is the desired frequency. Said frequency is obtained with an error of 0.5 kc. at the most, as stated above.

Referring now to Fig. 2 showing a simplified diagram of an oscillation generator executed in accordance with the invention, said device includes an oscillating device 1, of the continuously varying conventional type, which may generate oscillations of a frequency F1 capable of varying in a continuous manner, for example from 100 to 200 kc. An oscillator 2 of the piezoelectric quartz type having a resonance basic frequency of 100 kc. may generate by using ten harmonics oscillations of a frequency F2 differing one from the other by 100 kc., namely 900, 1000 etc. up to 1800 kc. The F1 and F2 oscillations are each fed to a mixer 3 of conventional form, from which issue after mixing the oscillations F1, F2 and F3, the latter being the sum of the frequencies of the incident oscillations. The output of mixer 3 is fed to a filter 4 which being adjusted according to oscillators 1 and 2, eliminates the F1 and F2 oscillations, passing oscillations F3 alone.

A second piezo-electric oscillator 5, the quartz of which has a resonance basic frequency of 1000 kc. for example, gives, by means of its harmonics, oscillations F4, having a 1000 kc. difference and which have as desired a frequency of 2000, 3000, etc. up to 10,000 kc. The F3 and F4 oscillations are each fed to a mixer 6, from which issue the oscillations F3, the oscillations F4 and oscillations F5, the frequency of the latter being the sum of the F3 and F4 oscillations.

Mixer 6 is followed by a filter 7 filtering by 1000 kc. steps, from which issue only the F5 oscillations but not the F3 and F4 oscillations.

The oscillations F1 being capable of varying in a continuous manner from 100 to 200 kc. and the oscillations F2 varying per 100 kc. steps, from 900 to 1800 kc., the oscillations F3 may vary in a continuous manner from 1000 to 2000 kc.; the oscillations F4 varying per 1000 kc. steps from 2000 to 10,000 kc. the oscillations F5 may vary in a continuous manner from 3000 to 12,000 kc.

The least favorable case in regard to filtering in filter 7 will take place when the latter receives oscillations F4 having a 10,000 kc. frequency and oscillations F5 having a frequency of 11,000 kc. Nevertheless filtering will be easily performed by means of a standard filter, the selectivity curve of which allows a tuning up to two decibels for a passing band of 100 kc. and affords a 30 decibels difference between the center of said band, corresponding to a frequency of 11,050 kc. and the nearest frequency, i. e. 10,000 kc. In practice the elimination of the oscillations F4 of a frequency equal to 10,000 kc., in the most unfavorable case, will be total and will be obtained by means of a filter of a standard type.

The filter 7 is followed by a separator-and-doubler device 8 which comprises three oscillating circuits 8', 8'', 8''', adapted to pass, respectively, the first, oscillations from 3,000 to 6,000 kc., the second, oscillations from 6,000 to 12,000 kc. and the third, oscillations from 12,000 to 24,000 kc., the output oscillations being then radiated from the antenna, after first being modulated by an audio-frequency modulator.

Referring now to Fig. 3, certain characteristics of the mechanical switches of an oscillation generator constructed for a receiver according to the invention will be described. The continuously variable oscillator 1 includes for tuning purposes a variable condenser 9 controlled by means of a knob 10 and a suitable mechanical transmission 11.

The piezo-electric oscillator 2, generating oscillations varying from 900 to 1800 kc. per 100 kc. steps includes a control lever or similar member 12, having ten steps according to the ten frequencies it may generate and is controlled by a ten step knob 13 and a suitable gearing 14.

Filter 4 comprises two tuning members, namely a variable condenser 15 fitted on gearing 11, the capacity of which varies in a manner corresponding to variable condenser 9 conventional arrangements are used to gang the circuits, the second controlling member of filter 4 having a lever 16 to insert in the circuit suitable inductances 17; said lever fitted on gearing 14 operated in turn by knob 13 inserts in filter 4,100 kc. stepped variations in a similar manner to the oscillator 2.

The frequency of the piezo-electric oscillator 5 is controlled by a ten step lever 18 to obtain frequencies from 2000 to 10,000 kc. per 1000 kc. steps. Lever 18 is operated by means of a knob 19 and a gearing 20.

Filter 7 comprises two controlling members, namely a first lever 21 fitted on gearing 14, cooperating with inductances 22, and a second lever 23 fitted on gearing 20 and cooperating with inductances 24. The set of levers 21 and 23 permits the adjustment of the filter on frequencies comprised between 3000 and 12,000 kc., with an interval of 100 kc. between them.

Knob 10, the units knob, capable of being moved continuously, has for example a mark moved before a kc. scale graduated from 0 to 99. The 10 step button 13, or hundreds knob, has a mark moving before a scale graduated from 0 to 9. Button 19, the thousands button, has a mark moving before a scale graduated as follows: 3, 4, 5 etc. up to 11.

Under such conditions, to adjust the transmission on a determined frequency, knobs 19, 13 and 10 will be adjusted to the corresponding figures, respectively to the figure of thousands, the figure of hundreds and the number of units, from 0 to 100, of the desired frequency. For example to adjust the transmission on a frequency of 4583 kc., knob 19 will be brought opposite digit 4, knob 13 opposite digit 5 and knob 10 opposite the division 83.

The quartz oscillators include known means to produce an output having a constant amplitude to 1 decibel for any order of the harmonic used.

Fig. 4 is a wiring schematic given by way of example of a preferred embodiment of a transmitter according to the invention, the frequency of which may vary in a continuous manner, for example from 3000 to 12,000 kc. Said device includes a pentode tube oscillator L1, generating harmonics, excited by means of a quartz crystal Q1 having a basic frequency of 100 kc., an oscillating circuit comprising the inductance S1 and the capacitor C1, and tuned to said frequency. The grid leak of tube L1 is R1 and the drop resistance of the screen grid of said tube is R2. C2 is a capacitor for uncoupling the screen. The oscillating circuit F2 fitted to the output of tube L1 comprises a fixed capacitor C3, and a ten tap inductance S2 to tune the circuit as desired on 900, 1000, 1100 etc. up to 1800 kc.

Tube L2 is a self-excited triode, the oscillating circuit F1 of which comprises an inductance S3 and a capacitor C4 consisting of a variable condenser in order that the oscillations from said tube L2 may vary in a continuous manner from 100 to 200 kc. C5 is a coupling capacitor and R3 is the grid leak.

The oscillations from pentode tube L1 and triode tube L2 excite the tube L3 of a first frequency changer, respectively through a coupling capacitor C6 of the injection grid and a coupling capacitor C7 of the control grid. R4 is the control grid leak and R5 the injection grid leak, C8 the screen uncoupling capacitor, R6 the drop resistance of the screen.

A filter oscillating circuit F3 comprises a ten tap inductance S4 the lever of which is mechanically coupled to the lever of inductance S2, for simultaneous operation; the capacity of the oscillating circuit F3 is constituted by a variable condenser C9 which, through a mechanical coupling, has a homologous position with condenser C4. Capacities are series-connected to the various taps of winding S6 in order to gang the circuits by known means. The oscillations from the first frequency changer are the result of the addition of the oscillations from the pentode tube L1 and the triode tube L2, excluding the oscillations proper to said tubes; accordingly they may vary in a continuous manner from 1000 to 2000 kc.

A second oscillator and harmonic generator pentode tube L4 includes in its oscillating grid circuit a crystal Q2 having a resonance basic frequency of 1000 kc. for example; R7 is an oscillating grid leak and R8 a drop resistance of the screen grid. The oscillating circuit of tube L4 includes an inductance S5 and a capacitor C10 adjusted to a 1000 kc. frequency. C11 is an uncoupling capacitor for the screen grid. The outlet of tube L5 includes an harmonic filter circuit F4, consisting in a nine tap inductance S6 and a condenser C12 which may be thus tuned on 2000, 3000, 4000, etc. up to 10,000 kc.

The oscillations from the pentode tube L4 and those from the first frequency changer are simultaneously fed to a tube L5 of a second frequency changer, the first ones through a capacitor C13 coupling the control grid and the second ones through a capacitor C16 coupling the injection grid. R9 is a control grid leak and R10 an injection grid leak. C17 is a capacitor for disconnecting the screen grids.

The outlet of the second frequency changer includes an outlet filter circuit F5 consisting in a ten tap inductance S7, the hand lever of which is mechanically coupled to hand levers of inductances S2 and S4. The filter circuit F5 includes further a nine tap inductance S7', the hand lever of which is mechanically coupled to the hand lever of inductance S6. C14 are fixed capacitors which may be selectively inserted into the circuit, corresponding to the nine positions of the hand lever of inductance S7'.

Oscillations from the described device are fed to the following stages through the coupling capacitor C15, and may have at will any value between 3000 and 12,000 kc. in the selected example.

The apparatus diagrammatically illustrated in Fig. 5 makes it possible to cover in a continuous manner a frequency band extending from theoretical zero to 30,000 kc., or in practice from say 100 kc. to 30,000 kc. A first oscillator 201 is controlled by a crystal having a fundamental frequency of 1000 kc. This is followed by a harmonics generator 202 followed in turn by a harmonic selector 203 which thus supplies output oscillations at any one of the frequency succession 1000, 2000, etc. up to 30,000 kc. The apparatus includes a second oscillator 204 stabilized by a quartz crystal having the fundamental frequency 100 kc., and followed by a harmonics generator 205 followed in its turn by a harmonic selector 206. In mixing, in a mixer 207, successively the harmonics issuing from selector 206 with a harmonic issuing from the selector 203, each of the 1000 kc. sections defined by the selector 203 is divided into intermediate subdivisions of 100, 200, 300, etc. up to 1000 kc. The resulting oscillations at the output from mixer 207 pass through a filter 208. The apparatus further includes a third oscillator 209, continuously variable in frequency over a range of from 100 to 200 kc. The oscillations issuing from the oscillator 209, which thus enable a continuous variation over any one of the intermediate 100 kc. bands thus defined, are mixed with the oscillations from the filter 208 in a mixer 210, and the resulting oscillations, after first having been passed through a filter 211, radiated by an antenna 212.

Figure 6:
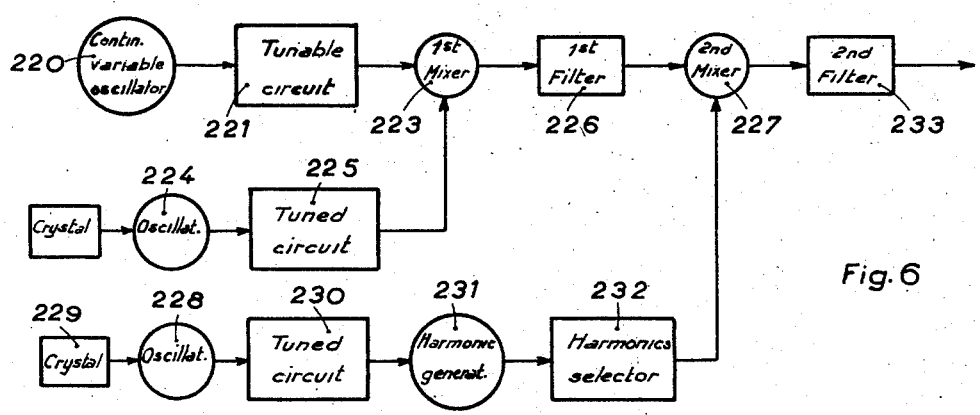
Figure 6 is a block diagram of another embodiment.

In the embodiment illustrated in Fig. 6, the oscillations issuing from an oscillator 220, continuously-variable in frequency, are passed through a tunable circuit 221, mixed in a mixer 223 with fixed frequency oscillations issuing from a crystal-stabilized oscillator 224 including a tuned circuit 225, so that the resultant oscillations may easily be filtered in a filter 226. The resultant oscillations are mixed in a second mixer 227 with oscillations issuing from an oscillator 228 controlled by a crystal 229 and including a tuned circuit 230. The oscillator 228 is followed by a harmonics generator 231 followed in turn by a harmonic selector 232. The oscillations provided by the mixer 227 next pass through a filter 233 adapted to pass only the resultant oscillations.

Figure 7:
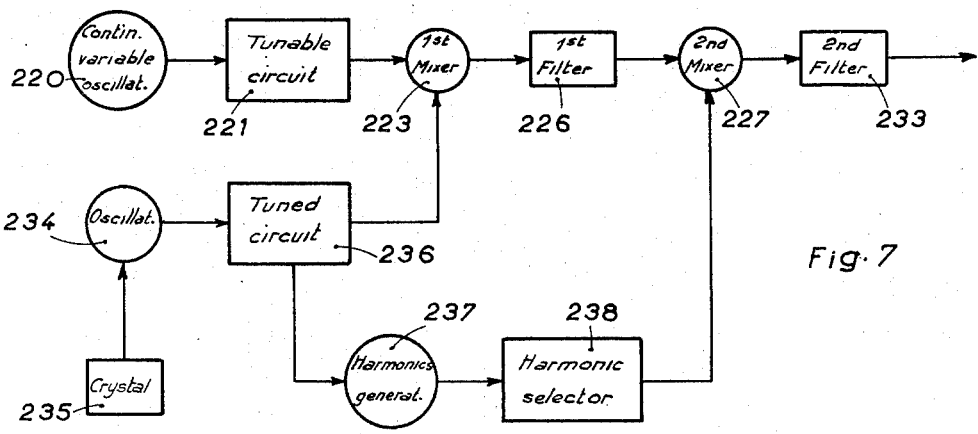
Figure 7 is a block diagram of a specific variation of the block diagram shown in Figure 6.

The form of embodiment shown in Fig. 7 is similar to the foregoing, except that a single oscillator 234 herein fulfills the functions of the oscillators 224 and 228 previously mentioned.

The oscillator 234 controlled by crystal 235 and including a tuned circuit 236 directly feeds fixed frequency oscillations to mixer 223. The oscillations fed to the second mixer 227 also come from the oscillator 234 provided with the tuned circuit 236, but through a harmonics generator 237 followed by a harmonic selector 238.

Figure 8:
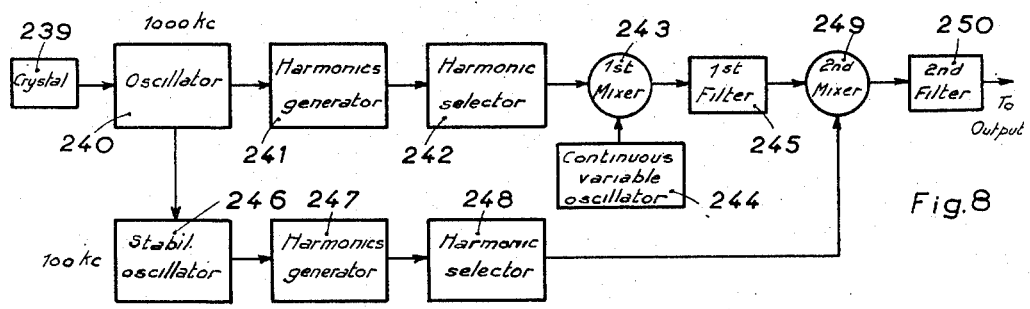
Figure 8 is a block diagram of another embodiment.

In the embodiment of Fig. 8, a single piezo-electric crystal is used for obtaining both successions of harmonics. The oscillator 240 is controlled by a crystal 239 whose fundamental frequency is 1000 kc. Following oscillator 240 is a harmonics generator 241, followed by a harmonic selector 242. The selected harmonic is mixed in a mixer 243 with the oscillations from an oscillator 244 continuously adjustable in frequency over a 100 kc. interval, the resulting oscillations being passed through a filter 245. The oscillator 246 provided for supplying a second succession of harmonics is, in this embodiment, frequency-stabilized from oscillations derived from the first oscillator 240. The stabilized oscillator 246 is followed by a harmonics generator 247 followed in turn by a harmonics selector 248. The selected harmonic from the second succession is mixed in a second mixer 249 with the resultant oscillations fed out of the filter 245, and the oscillations issuing from this mixing are after being passed through a filter 250 which only passes the resultant oscillations, fed to the output circuit.

Figure 9:
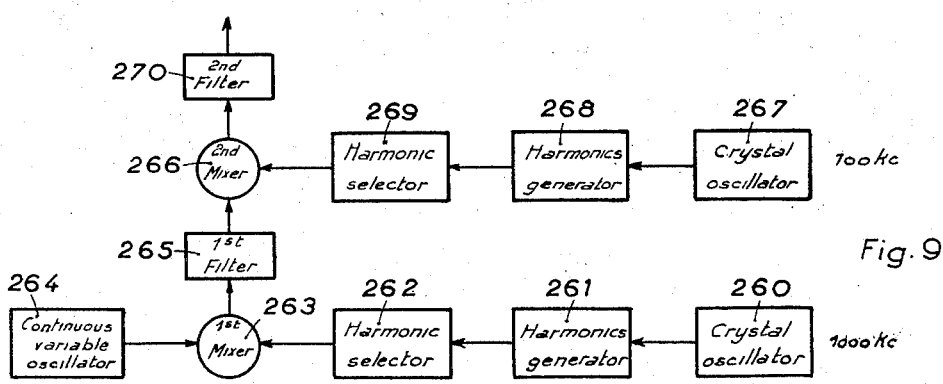
Figure 9 is a block diagram of another embodiment.

In the embodiment of Fig. 9, the higher-frequency harmonics succession is supplied by a crystal-controlled oscillator 260 followed by a harmonics generator 261 and a harmonic selector 262. The selected harmonic is mixed in a first mixer 263 with oscillations from a continuously frequency adjustable oscillator 264. The oscillations resulting from the mixing may easily be separated in a filter 265 which it is not necessary to provide with variable condensers, thus eliminating the problem of their ganging, as their frequencies differ greatly from those of the component oscillations. The said resultant oscillations are mixed in a second mixer 266 with one harmonic of the lower-frequency succession of harmonics supplied by a crystal oscillator 267 followed by a harmonics generator 268 followed in turn by a harmonic selector 269. The oscillations issuing from this second mixing are passed through a filter 270 adapted to pass only the resultant oscillations, and are fed to the output circuit.

Referring now to Fig. 10 showing a block diagram of an alternative form of the device, the latter includes an oscillator 51, whose frequency F10 may be varied in a continuous manner, for example between 200 and 300 kc. Said oscillator includes an oscillating circuit 52. A second oscillator 53, whose frequency is controlled by a piezo-electric crystal 54 and includes an oscillating circuit 55, supplies at its outlet oscillations of a fixed frequency F11, for example 1000 kc.

The oscillations of frequency F10 are added to oscillations of frequency F11. Said addition is preferably achieved in a symmetrical device 56 and the resulting oscillations, without the component oscillations eliminated in filter 57, have a value of F12 which, in this instance, may vary in a continuous manner between 1200 and 1300 kc.

The oscillations of frequency F11 excite an harmonics generator 58, from which the harmonic of the desired order may be extracted in a filter 59 and said harmonic of frequency F13 will be added in a mixer 60 to the oscillations of frequency F12.

In the example shown, the devices 58 and 59 supply the harmonics of 6th to 10th order of the resonance frequency of crystal 54, i. e. oscillations of 6000, 7000 etc. up to 10,000 kc.

The set includes a third oscillator 61, whose frequency is stabilized, not by a piezo-electric crystal being part of this oscillator, but through synchronization from the first crystal oscillator 53. Oscillator 61 supplies oscillations of fixed basic frequency, for example of 100 kc., at a value determined by an oscillating circuit 62, and feeds an harmonics selector 63—64 in order to obtain the harmonic of the selected order. In the example shown, thus, harmonics of the 6th to 17th order of the basic frequency of the oscillator 61 may be obtained and the oscillations from filter 64 have as desired a frequency F14 equal to 800, 900 etc. up to 1700 kc.

The oscillations, of frequency F15, resulting from mixing in device 60 the oscillations of frequency F13 and F12 and selection in filter 65, are mixed in mixer 66 with the oscillations of frequency F14 and the resulting oscillations, of frequency F16, after elimination of the component oscillations in filter 67, are led to the conventional amplification stages of a transmitting set.

Fig. 11 is a wiring schematic of one form of execution of such a device.

The oscillations whose frequency may vary in a continuous manner, for example from 200 to 300 kc., are generated in an oscillating tube 70 composed of the usual parts, the oscillating circuit 71 including a variable condenser 72 to adjust the frequency of the oscillations to any selected value between 200 and 300 kc.

Said oscillations are led in parallel to both injection grids 73 and 74 of tubes 75 and 76 excited on the other hand in opposition by their grids 78 and 79 with the oscillations of fixed frequency, for example 1000 kc., generated by an oscillating tube 80, whose frequency is stabilized by a piezo-electric crystal 81; said oscillations are taken at the ends of the secondary winding 82 of a transformer 83, the primary 84 of which is connected to the plate circuit of tube 80. The grids 73 and 74 and the primary of a transformer 85, being inserted in the plate circuits of tubes 75 and 76, constitute a symmetric circuit 77.

The component oscillations of 1000 kc. frequency are eliminated at the outlet of filter 86 since its primary is symmetrically connected in opposition. The resulting oscillations, which may vary in a continuous manner from 1200 to 1300 kc., are received at filter outlet 86 including a variable condenser 87 connected for example by a mechanical coupling 88 (shown in dotted line in the drawing) to variable condenser 72.

The oscillations generated by tube 80 excite also an harmonics generating tube 89 by means of its grid 90 followed by an harmonics selector 91, the movable member 92 of which allows selection at will of any of said harmonics, for example an harmonic of the order six to ten, supplying thus to grid 93 of a mixer tube 94 oscillations having a frequency of 6000, 7000, etc., up to 10,000 kc. The tube 94 is further excited on its grid 95 by the oscillations from filter 86.

The resulting oscillations in the circuit of plate 96 are separated from the component oscillations in a band passing filter 97 (without variable condenser) whose movable member 98 is coupled by a mechanical coupling 99 to the movable member 92. The frequency of the resulting oscillations may have any value between 4700 and 4800 kc., between 5700 and 5800 kc., between 6700 and 6800 kc., etc. The interval between said bands, only 100 kc. wide, allows the use of a filter 97 having no variable condenser.

The oscillations generated by the oscillating tube 80 also excite an oscillating tube 101 through grid 100 to synchronize this tube, the frequency of which and of oscillating circuit 102, is kept to a fixed value, for example 100 kc. The oscillating circuit 102 includes an initial adjusting condenser 103. The oscillations from the plate circuit 104 are fed to an harmonic generating tube 105 and the selection of the required harmonic is obtained in a filter 106 comprising two circuits coupled to critical coupling in order to obtain the maximum of selectivity. The movable members 107 and 108 of said filter are coupled together by a mechanical linkage 109.

The oscillations from filter 106 have thus a frequency which is 800, 900 or 1700 kc. They are fed to grid 110 of a mixer 111, the other grid 112 of which is excited by the oscillations from filter 97. The resulting oscillations flow in an oscillating circuit 113 comprising a multi-step inductance 114, selected by a movable member 115, coupled by a mechanical linkage 116 to movable members 92 and 98. The condenser 117 of said oscillating circuit is variable. Said oscillations, fed to the other stages of the transmitter, have a frequency which may vary in a continuous manner, in this instance from 3000 to 8000 kc.

The following table will give the values of the above defined frequencies, in the considered example, to obtain oscillations of a frequency which may have any value between 3000 and 4100 kc. The table may be extended for higher values, for example up to 8000 kc., as in the selected example.

| F10 | F11 | F12 | F13 | F15 | F14 | F16 |
|---|---|---|---|---|---|---|
| 300 to 200 | 1,000 | 1,300 to 1,200 | 6,000 | 4,700 to 4,800 | 1,700 | 3,000 to 3,100 |
| 300 to 200 | 1,000 | 1,300 to 1,200 | 6,000 | 4,700 to 4,800 | 1,600 | 3,100 to 3,200 |
| 300 to 200 | 1,000 | 1,300 to 1,200 | 6,000 | 4,700 to 4,800 | 1,500 | 3,200 to 3,300 |
| 300 to 200 | 1,000 | 1,300 to 1,200 | 6,000 | 4,700 to 4,800 | 1,400 | 3,300 to 3,400 |
| 300 to 200 | 1,000 | 1,300 to 1,200 | 6,000 | 4,700 to 4,800 | 1,300 | 3,400 to 3,500 |
| 300 to 200 | 1,000 | 1,300 to 1,200 | 6,000 | 4,700 to 4,800 | 1,200 | 3,500 to 3,600 |
| 300 to 200 | 1,000 | 1,300 to 1,200 | 6,000 | 4,700 to 4,800 | 1,100 | 3,600 to 3,700 |
| 300 to 200 | 1,000 | 1,300 to 1,200 | 6,000 | 4,700 to 4,800 | 1,000 | 3,700 to 3,800 |
| 300 to 200 | 1,000 | 1,300 to 1,200 | 6,000 | 4,700 to 4,800 | 900 | 3,800 to 3,900 |
| 300 to 200 | 1,000 | 1,300 to 1,200 | 6,000 | 4,700 to 4,800 | 800 | 3,900 to 4,000 |
| 300 to 200 | 1,000 | 1,300 to 1,200 | 7,000 | 5,700 to 5,800 | 1,700 | 4,000 to 4,100 |

In practice to control the frequency of the oscillations transmitted the set comprises three control members corresponding to the variations of frequency F10, of frequency F14 and of frequency F13.

The last moves before the Figures "3" to "7" corresponding to thousands of kc., the second one moves before a 0 to 9 scale, corresponding to hundreds of kc. and the first one before a 0–100 scale, corresponding to kc.

Referring now to the above table, it may be seen for example that the Figure "3" of the thousands of kc. scale corresponds to a value of F13 equal to 6000 kc., that the Figure "6" of the scale of the hundreds of kc. corresponds to a value of F14 equal to 1100 kc., that the Figure "25" of the kc. dial corresponds to a value of F10 equal to 275 kc.

We claim:

1. In a system for transmitting radio frequency signals of any frequency selected from a wide continuous frequency band, in combination: a crystal stabilized oscillation generator supplying a discontinuous multiplicity of uniformly spaced frequencies having a range the limits of which substantially coincide with said wide frequency band in the frequency spectrum, tuning means connected to said first oscillator for selecting one frequency from said discontinuous multiplicity, a second oscillation generator continuously variable over an interval substantially narrower than said wide band, said interval being substantially not greater than the interval between any two successive frequencies of said uniformly spaced frequencies and positioned in the frequency spectrum toward the lower limit thereof, second tuning means connected to said second oscillator, means connected to the outputs of said generators for combining the oscillations from said first and second oscillation generators to produce resultant oscillations, and a filter connected to the output of said combining means and tunable over substantially all of said wide frequency band.

2. In a system for transmitting radio frequency signals of any frequency selected from a wide continuous frequency band, in combination: a crystal stabilized oscillation generator, a harmonics generator connected to the output of said crystal stabilized oscillator and supplying a discontinuous multiplicity of uniformly spaced frequencies having a range the limits of which substantially coincide with said wide frequency band in the frequency spectrum, a second oscillation generator continuously variable over an interval substantially narrower than said wide band, said interval being substantially not greater than the interval between any two successive frequencies of said uniformly spaced frequencies and positioned in the frequency spectrum towards the lower limit thereof, means connected to the outputs of said generators for mixing the oscillations from said second oscillation generator and said harmonics generator, a tunable filter connected to the output of said mixing means, a first separate control connected to said harmonics generator and said tunable filter for selecting one frequency from said discontinuous multiplicity and for tuning said filter, and a second separate control connected to said second oscillation generator and said tunable filter for simultaneously tuning said second oscillation generator and said filter.

3. In a system for transmitting radio frequency signals of any frequency selected from a wide continuous frequency band, in combination: a crystal stabilized oscillation generator, a harmonics generator connected to the output of said oscillation generator and supplying a discontinuous multiplicity of uniformly spaced frequencies having a range the limits of which substantially coincide with said wide frequency band in the frequency spectrum, means for selecting one of said multiplicity of uniformly spaced frequencies, a second oscillation generator continuously variable over a range substantially not greater than the interval between any two successive frequencies of said uniformly spaced frequencies, means for producing a single stabilized frequency, first mixing means connected to the output of said second oscillation generator and to said single stabilized frequency means, second mixing means connected to the output of said first mixing means and the output of said harmonics generator, and a tunable filter connected to the output of said second mixer.

4. An apparatus as in claim 3 wherein the means for producing a single fixed frequency is stabilized by said crystal oscillator.

5. In a system for transmitting radio frequency signals of any frequency selected from a wide continuous frequency band, in combination: a first crystal stabilized oscillation generator supplying a discontinuous multiplicity of uniformly spaced frequencies having a range the limits of which substantially coincide with said wide frequency band in the frequency spectrum, a second crystal stabilized oscillation generator supplying a second discontinuous multiplicity of uniformly spaced frequencies having a range which substantially coincides with the interval between any two successive frequencies of said first discontinuous multiplicity and is positioned in the frequency spectrum towards the lower limit thereof, a third oscillation generator continuously variable over an interval substantially not greater in width than the interval between any two successive frequencies of said second discontinuous multiplicity and positioned in the frequency spectrum toward the lower limit thereof, a first mixer connected to the outputs of two of said three oscillation generators, a second mixer connected to the outputs of both said first mixer and the third of said oscillation generators, and a tunable filter connected to the output of said second mixer and tunable over said wide frequency band.

6. In a system for transmitting radio frequency signals of any frequency selected from a wide continuous frequency band, in combination: a first crystal stabilized oscillation generator including a first harmonics generator supplying a discontinuous multiplicity of uniformly spaced frequencies having a range the limits of which substantially coincide with said wide frequency band in the frequency spectrum, first selecting means connected to said first harmonics generator for selecting one frequency from said discontinuous multiplicity, a second crystal stabilized oscillation generator including a second harmonics generator and supplying a second discontinuous multiplicity of uniformly spaced frequencies having a range which substantially coincides with the interval between any two successive frequencies of said first discontinuous multiplicity and spaced in the frequency spectrum toward the lower limit thereof, second selecting means for selecting one frequency from said second discontinuous multiplicity of frequencies, a third oscillation generator continuously variable over an interval substantially not greater in width than the interval between any two successive frequencies of said second discontinuous multiplicity, a first mixer connected to the outputs of two of said three oscillation generators, a second mixer connected to the outputs of said first mixer and the other of said oscillation generators, and a filter connected to the output of said second mixer and tunable over substantially all of said wide frequency band.

7. In a system for transmitting radio frequency signals of any frequency selected from a wide continuous frequency band, in combination: a first crystal stabilized oscillation generator including a first harmonics generator supplying a discontinuous multiplicity of uniformly spaced frequencies having a range the limits of which substantially coincide with said wide frequency band in the frequency spectrum, first selecting means connected to said first harmonics generator for selecting one frequency from said discontinuous multiplicity, a second crystal stabilized oscillation generator including a second harmonics generator and supplying a second discontinuous multiplicity of uniformly spaced frequencies having a range which substantially coincides with the interval between any two successive frequencies of said first discontinuous multiplicity and spaced in the frequency spectrum toward the lower limit thereof, second selecting means connected to said second harmonics generator for selecting one frequency from said second discontinuous multiplicity of frequencies, a third oscillation generator continuously variable over an interval substantially not greater in width than the interval between any two successive frequencies of said second discontinuous multiplicity, a first mixer connected to the outputs of said second and third oscillation generators, a tunable filter connected to the output of said first mixer, a second mixer connected to the outputs of said first filter and said first oscillation generator, and a tunable filter connected to the output of said second mixer.

8. In a system for transmitting radio frequency signals of any frequency selected from a wide continuous frequency band, in combination: a first crystal stabilized oscillation generator including a first harmonics generator supplying a discontinuous multiplicity of uniformly spaced frequencies having a range the limits of which substantially coincide with said wide frequency band in the frequency spectrum, first selecting means connected to said first harmonics generator for selecting one frequency from said discontinuous multiplicity, a second crystal stabilized oscillation generator including a second harmonics generator and supplying a second discontinuous multiplicity of uniformly spaced frequencies having a range which substantially coincides with the interval between any two successive frequencies of said first discontinuous multiplicity and spaced in the frequency spectrum toward the lower limit thereof, second selecting means connected to said second harmonics generator for selecting one frequency from said second discontinuous multiplicity of frequencies, a third oscillation generator continuously variable over an interval substantially not greater in width than the interval between any two successive frequencies of said second discontinuous multiplicity, a first mixer connected to the outputs of said second and third oscillation generators, a first tunable filter connected to the output of said first mixer, a second mixer connected to the output of said first filter and said first oscillation generator, a second tunable filter connected to the output of said second mixer, a first control connected to said third oscillation generator and said first filter for controlling the frequencies thereof, a second control connected to said second selecting means and to said first and second filters for selecting one of said second discontinuous multiplicity of frequencies and for adjusting the pass frequencies of both of said filters, and a third control connected to said first selecting means and said second filter for selecting one of said first discontinuous multiplicity of frequencies and for adjusting the pass frequency of said second filter.

9. In a system for transmitting radio frequency signals of any frequency selected from a wide continuous frequency band, in combination: a first crystal stabilized oscillation generator including a first harmonics generator supplying a discontinuous multiplicity of uniformly spaced frequencies having a range the limits of which substantially coincide with said wide frequency band in the frequency spectrum, first selecting means connected to said first harmonics generator for selecting one frequency from said discontinuous multiplicity, a second crystal stabilized oscillation generator including a second harmonics generator and supplying a second discontinuous multiplicity of uniformly spaced frequencies having a range which substantially coincides with the interval between any two successive frequencies of said first discontinuous multiplicity and spaced in the frequency spectrum toward the lower limit thereof, second selecting means connected to said second harmonics generator for selecting one frequency from said second discontinuous multiplicity of frequencies, a third oscillation generator continuously variable over an interval substantially not greater in width than the interval between any two successive frequencies of said second discontinuous multiplicity, a first mixer connected to the outputs of said first and second oscillation generators, a first filter connected to the output of said first mixer, a second mixer connected to the outputs of said first filter and said third oscillation generator, and a second filter connected to the output of said second filter and tunable over substantially all of said wide frequency band.

10. In a system for transmitting radio frequency signals of any frequency selected from a wide continuous frequency band, in combination: a first crystal stabilized oscillation generator including a first harmonics generator supplying a discontinuous multiplicity of uniformly spaced frequencies having a range the limits of which substantially coincide with said wide frequency band in the frequency spectrum, first selecting means connected to said first harmonics generator for selecting one frequency from said discontinuous multiplicity, a second crystal stabilized oscillation generator including a second harmonics generator and supplying a second discontinuous multiplicity of uniformly spaced frequencies having a range which substantially coincides with the interval between any two successive frequencies of said first discontinuous multiplicity and spaced in the frequency spectrum toward the lower limit thereof, second selecting means connected to said second harmonics generator for selecting one frequency from said second discontinuous multiplicity of frequencies, a third oscillation generator continuously variable over an interval substantially not greater in width than the interval between any two successive frequencies of said second discontinuous multiplicity, a first mixer connected to the outputs of said first and third oscillation generators, a first filter connected to the output of said first mixer, a second mixer connected to the outputs of said first filter and said second oscillation generator, and a second filter connected to the output of said second mixer and tunable over substantially all of said wide frequency band.

11. In a system for transmitting radio frequency signals of any frequency selected from a wide continuous frequency band, in combination: a first crystal stabilized oscillation generator including a first harmonics generator supplying a discontinuous multiplicity of uniformly spaced frequencies having a range the limits of which substantially coincide with said wide frequency band in the frequency spectrum, first selecting means connected to said first harmonics generator for selecting one frequency from said discontinuous multiplicity, a second stabilized oscillation generator connected to said first oscillation generator and including a second harmonics generator supplying a second discontinuous multiplicity of uniformly spaced frequencies having a range which substantially coincides with the interval between any two successive frequencies of said first discontinuous multiplicity and spaced in the frequency spectrum toward the lower limit thereof, second selecting means connected to said second harmonics generator for selecting one frequency from said second discontinuous multiplicity of frequencies, a third oscillation generator continuously variable over an interval substantially not greater in width than the interval between any two successive frequencies of said second discontinuous multiplicity, a first mixer connected to the outputs of said first and third oscillation generators, a first filter connected to the output of said first mixer, a second mixer connected to the outputs of said first filter and said second oscillation generator, and a second filter connected to the output of said second mixer and tunable over substantially all of said wide frequency band.

12. In a system for transmitting radio frequency signals of any frequency selected from a wide continuous frequency band, in combination: a crystal stabilized oscillator, a first stabilized oscillator generator connected to said oscillator and supplying a first discontinuous multiplicity of uniformly spaced frequencies having a range the limits of which substantially coincide with said wide frequency band in the frequency spectrum, a first tuning element connected to said first oscillation generator for selecting one frequency from said discontinuous multiplicity of frequencies, a second stabilized oscillation generator connected to said oscillator and supplying a second discontinuous multiplicity of uniformly spaced frequencies having a range the limits of which substantially coincide with the interval between any two successive frequencies of said first discontinuous multiplicity, a second tuning element connected to said second oscillation generator for selecting one frequency from said second discontinuous multiplicity of frequencies, a third oscillation generator continuously variable over an interval substantially not greater than the interval between any two successive frequencies of said second multiplicity of frequencies and positioned in the frequency spectrum toward the lower limit thereof, a third tuning element connected to said third oscillation generator for adjusting the frequency of said third oscillation generator, a first mixer connected to the outputs of both said oscillator and said third oscillation generator, a first tunable filter connected to the output of said first mixer, a second mixer connected to the outputs of both said first tunable filter and said first oscillation generator, a second tunable filter connected to the output of said second mixer, a third mixer connected to the output of both said tunable filter and said second oscillation generator, and a third tunable filter connected to the output of said third mixer.

13. In a system for transmitting radio frequency signals of any frequency selected from a wide continuous frequency band, in combination: a crystal stabilized oscillator, a first stabilized oscillation generator connected to said oscillator and including a harmonics generator for supplying a first discontinuous multiplicity of uniformly spaced frequencies having a range the limits of which substantially coincide with said wide frequency band in the frequency spectrum, a first tuning element connected to said first oscillation generator for selecting one frequency from said discontinuous multiplicity of frequencies, a second stabilized oscillation generator connected to said oscillator including a second harmonics generator for supplying a second discontinuous multiplicity of uniformly spaced frequencies having a range the limits of which substantially coincide with the interval between any two successive frequencies of said first discontinuous multiplicity, a second tuning element connected to said second oscillation generator for selecting one frequency from said second discontinuous multiplicity of frequencies, a third oscillation generator continuously variable over an interval substantially not greater than the interval between any two successive frequencies of said second multiplicity of frequencies and positioned in the frequency spectrum toward the lower limit thereof, a third tuning element connected to said third oscillation generator for adjusting the frequency of said third oscillation generator, a first mixer connected to the outputs of both said oscillator and said third oscillation generator, a first tunable filter connected to the output of said first mixer, a second mixer connected to the outputs of both said first tunable filter and said first oscillation generator, a second tunable filter connected to the output of said second mixer, a third mixer connected to the output of both said second tunable filter and said second oscillation generator, and a third tunable filter connected to the output of said third mixer.

14. In a system for transmitting radio frequency signals of any frequency selected from a wide continuous frequency band, in combination: a crystal stabilized oscillator, a first stabilized oscillation generator connected to said oscillator and including a first harmonics generator and selector therefor for supplying any selected frequency from a first discontinuous multiplicity of uniformly spaced frequencies having a range the limits of which substantially coincide with said wide frequency band in the frequency spectrum, a second stabilized oscillation generator connected to said oscillator and including a second harmonics generator and selector therefor for supplying any frequency from a second discontinuous multiplicity of uniformly spaced frequencies having a range the limits of which substantially coincide with the interval between any two successive frequencies of said first multiplicty, a third oscillation generator continuously variable over an interval substantially not greater in width than the interval between any two successive frequencies of said second multiplicity and positioned in the frequency spectrum toward the lower limit thereof, a first mixer connected to the outputs of both said oscillator and said third oscillation generator, a first tunable filter connected to the output of said first mixer, a second mixer connected to the outputs of both said first tunable filter and said first oscillation generator, a second tunable filter connected to the output of said second mixer, a third mixer connected to the outputs of both said second tunable filter and said second oscillation generator, a third tunable filter connected to the output of said third mixer, a first control connected to both said third oscillation generator and said first filter for simultaneously adjusting the frequencies thereof, a second control connected to said first harmonics selector and to said second and third filters for simultaneously selecting one of said first discontinuous multiplicity of frequencies and adjusting the pass frequencies of said filters, and a third control connected to said second harmonics selector for selecting one of said second discontinuous multiplicity of frequencies.

References Cited in the file of this patent

UNITED STATES PATENTS

| Number | Name | Date |
|---|---|---|
| 2,131,558 | Granger | Sept. 27, 1938 |
| 2,231,634 | Monk | Feb. 11, 1941 |
| 2,252,870 | Slonczewski | Aug. 19, 1941 |
| 2,265,083 | Peterson | Dec. 2, 1941 |
| 2,270,023 | Ramsay et al. | Jan. 13, 1942 |
| 2,401,481 | Harnett | June 4, 1946 |

FOREIGN PATENTS

| Number | Country | Date |
|---|---|---|
| 486,448 | Great Britain | June 2, 1938 |